United States Patent [19]

Schwark et al.

[11] 4,432,119
[45] Feb. 21, 1984

[54] ELECTRICALLY RELEASED SEAT BELT BUCKLE

[75] Inventors: O. Jay Schwark, Utica, Mich.; Yogendra S. Loomba, Knoxville, Tenn.

[73] Assignee: Allied Corporation, Morris Township, Morris County, N.J.

[21] Appl. No.: 940,543

[22] Filed: Sep. 8, 1978

[51] Int. Cl.³ ............................................. A44B 19/00
[52] U.S. Cl. .................................................. 24/603
[58] Field of Search .......... 24/230 A, 230 R, 230 AT, 24/230 AK, 230 AL, 230 AP; 280/150 SB; 244/151 A, 151 B

[56] References Cited

U.S. PATENT DOCUMENTS

| | | | |
|---|---|---|---|
| 1,493,479 | 5/1924 | Deatrick | 24/230 A X |
| 3,062,169 | 11/1962 | Cook | 24/230 A S |
| 3,148,909 | 8/1964 | Tantlinger | 24/230 AK |
| 3,294,339 | 12/1966 | Fontaine | 24/230 A X |
| 3,449,800 | 6/1969 | Fisher | 24/230 A X |
| 3,555,633 | 1/1971 | Paul | 24/230 A |
| 3,922,762 | 12/1975 | Turner | 24/230 R |

*Primary Examiner*—Nile C. Byers, Jr.

*Attorney, Agent, or Firm*—Roger H. Criss

[57] ABSTRACT

In a seat belt buckle comprising a housing, an opening in the housing adapted to receive a cooperating tongue having a locking portion, a locking member provided in the housing for locking engagement with the locking portion of the tongue when the tongue is inserted into the opening, and releasing mechanism for releasing the locking member from locking engagement with the locking portion of the tongue, the improvement comprising:

the releasing mechanism being comprised of
  (a) an electrically energizable actuator; and
  (b) a connector in contact with the actuator and the locking member, the connector being movable upon energization and deenergization of the actuator;

the locking member being movable in response to movement of the connector between a first position at which the locking member is in locking engagement with the locking portion of the tongue and a second position at which the locking member is out of locking engagement with the locking portion of the tongue.

10 Claims, 6 Drawing Figures

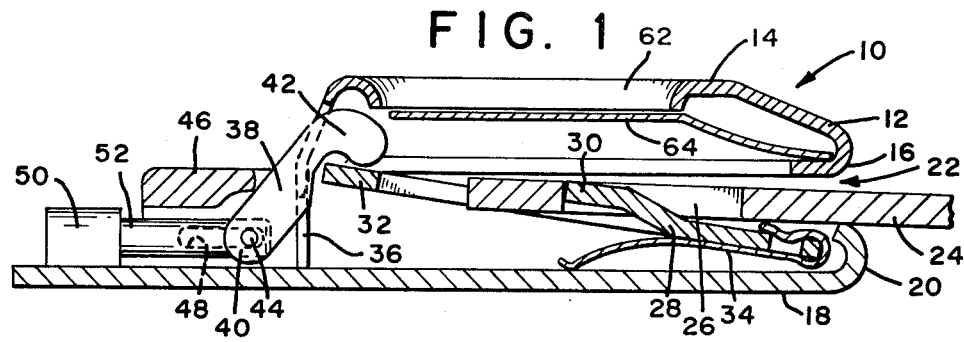
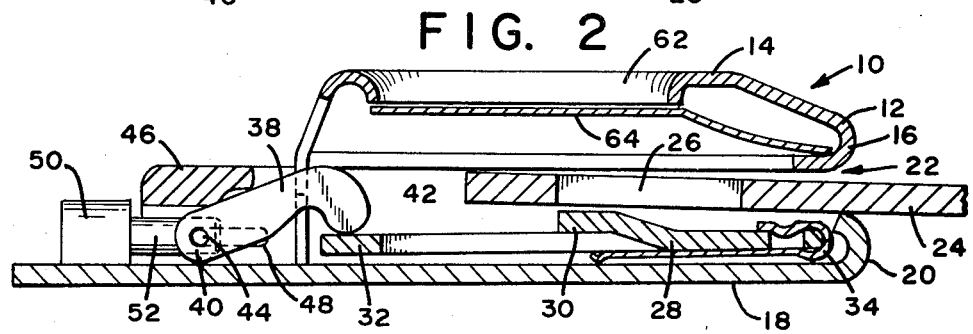
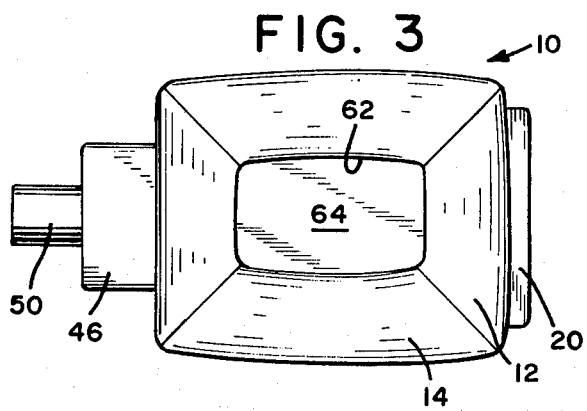
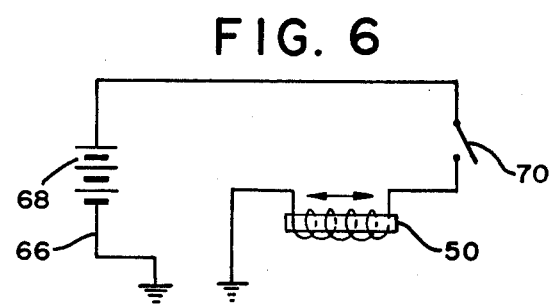
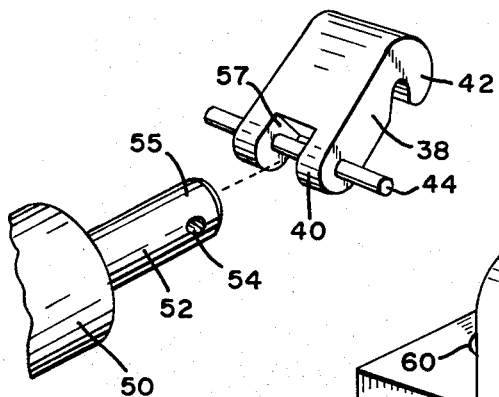
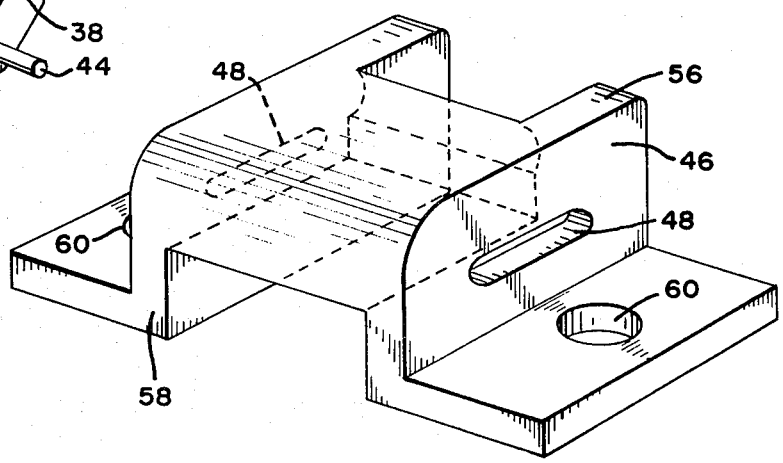

ELECTRICALLY RELEASED SEAT BELT BUCKLE

BACKGROUND OF THE INVENTION

1. Field of the Invention

This invention relates to seat belt buckles.

2. Description of the Prior Art

Seat belt buckles are generally provided with a manual, mechanical releasing means, such as a push button, to release a locking member so that a cooperating tongue can be removed from the buckle to unfasten the seat belt. It would be desirable if a releasing means were provided which automatically released the tongue and thereby unfastened the seat belt when desired.

SUMMARY

In accordance with this invention, there is provided in a seat belt buckle comprising a housing, an opening in the housing adapted to receive a cooperating tongue and having a locking portion, a locking member provided in the housing for locking engagement with the locking portion of tongue when the tongue is inserted into the opening, and releasing means for releasing the locking member from the locking engagement with the locking portion of the tongue, the improvement comprising:

the releasing means being comprised of:
(a) an electrically energizable actuator; and
(b) connecting means in contact with the actuator and the locking member, the connecting means being movable upon energization and deenergization of the actuator;

the locking member being movable in response to movement of the connecting means between a first position at which the locking member is in locking engagement with the locking portion of the tongue and a second position at which the locking member is out of locking engagement with the locking portion of the tongue.

The buckle of this invention includes an electrically actuated release means which moves the locking member, through a connecting means (such as a lever), to its release position. As a result, the release of a locking member may be facilitated by actuation of a switch provided in a position remote from the buckle housing. The switch may be actuated in response to a variety of conditions, including automatic actuation upon the opening of a door, etc., or manual remote actuation such as upon closing of a switch provided on the dashboard or other location. The improved releasing means in accordance with this invention may be utilized with any buckle design.

BRIEF DESCRIPTION OF THE DRAWINGS

FIG. 1 is a longitudinal sectional view of the buckle of this invention, with the locking member in its lock position.

FIG. 2 is a view similar to FIG. 1 with the locking member in its unlock position.

FIG. 3 is a plan view of the buckle of FIG. 1.

FIG. 4 is an enlarged side elevation view of a solenoid actuator and connecting means.

FIG. 5 is an enlarged side elevation view of the housing for the connecting means.

FIG. 6 is a schematic view of an electrical circuit for the actuator.

DESCRIPTION OF THE PREFERRED EMBODIMENTS

With respect to the drawings, there is shown a typical buckle 10 having a housing 12 including an upper housing portion 14 and a lower housing portion 18 suitably secured together. The buckle housing and the internal locking features may be of any conventional design. As shown, upper portion 14 may be provided with a reentrantly folded front portion 16 and lower portion 18 may likewise be provided with a similar reentrantly folded front portion 20. Front portions 16 and 20 are spaced apart so as to provided a slotted opening 22 through which a conventional tongue 24 may be inserted. Tongue 24 is provided with an opening 26 which is adapted to be engaged by a locking member in a known manner. Locking member 28 has one end pivoted in front portion of lower housing portion 18 and is provided with a lock face 30 adapted for insertion into opening 26 and thereby lock tongue 24 within the buckle. The end 32 of locking member 28 opposed from front portion 20 is adapted for movement by a connecting means as is described hereinafter. Leaf spring 34 engages the front portion of locking member 28 and normally biases locking member 28 upwardly into a first position at which locking face 30 engages tongue 24.

Provided at the rear portion 36 of housing 12 is the releasing means of this invention. The releasing means includes a connecting means, shown in the form of a pivotable lever 38, and an electrically energizable actuator 50. One end 40 of lever 38 is in contact with actuator 50 and the opposite end 40 of lever 38, which is provided with a cam surface, is adapted for contact with end portion 32 of locking member 28. Lever 38 is pivotally mounted on pin 44 adjacent to end 40. Pin 44 is mounted for sliding movement within slots 48 provided in housing 46 for the releasing means. Actuator 50 is preferably in the form of a solenoid having a plunger 52 that is in contact with lever 38. For this purpose, plunger 52 may be provided with an aperture 54 adapted to receive pin 44, with a front end 55 of plunger 52 adapted to be received in opening 57 of lever 38. Solenoid 50 is suitably mounted on base portion 18 of buckle housing 12.

Releasing means housing 46 has a front portion 56 adapted to abut rear portion 36 of housing 12 and a rear portion 58 adapted to be mounted adjacent to solenoid 50. As indicated above, longitudinal slots 48 are provided in housing 46 and are adapted to receive the ends of pin 44. Housing 46 is mounted on base portion 18 of buckle housing 12 via a suitable fastening means (not shown) provided through mounting apertures 60.

As shown in FIG. 6, solenoid 50 is electrically connected by circuit 66 to a source of electrical energy, preferably battery 68 provided in the vehicle in which the buckle is mounted. Also provided in circuit 66 is a switch 70 mounted in a location remote from the buckle.

Solenoid plunger 52 is adapted to be extended and retracted as solenoid 50 is energized and deenergized. Energization and deenergization of solenoid 50 is controlled by the opening and closing of switch 70.

Buckle 10 is suitably connected to a cable, webbing or similar connector for mounting within a vehicle. Likewise, tongue 24 is suitably provided with connecting means to a seat belt which may be in turn connected to a conventional seat belt retractor.

In operation, tongue 24 is inserted into buckle 10 through opening 22 to fasten the seat belt. When tongue 24 is fully inserted in buckle 10, locking member 28 is moved by spring 34 into locking engagement with tongue 24, with lock face 30 entering into aperture 26. End portion 32 of locking member 28 is in contact with end 42 of lever 38. The lock position of the buckle is shown in FIG. 1. In this case, solenoid 50 has been energized by closing of switch 70 (which occurs, for example, upon closing of the vehicle door). Plunger 52 is fully extended with lever 38 being provided in an upward position.

When release of tongue 24 from buckle 10 is desired, switch 70 is opened (e.g., upon opening of a vehicle door) thereby deenergizing solenoid 50. Plunger 52 is thus retracted and its rearward motion causes downward pivoting of lever 38 about pin 44. As lever 38 is pivoted, cam face 42 depresses end 32 of lever 28 downwardly towards base 18 of housing 12 and against the bias of spring 34. When lever 28 is so depressed, its lock face 30 is removed from opening 26 in tongue 24 and tongue 24 is thus released from the buckle. Tongue 24 may be manually withdrawn from buckle 10 or it may be withdrawn due to the rewind force associated with a rewind spring of a seat belt retractor to which the buckle is attached. Alternatively, ejecting means, such as in the form of ejection springs, may be provided in the buckle housing to eject the tongue from the buckle in a known manner when the locking member is moved to its unlocked position.

It is to be understood that the solenoid may be arranged such that upon energization of the solenoid, the connecting means is moved so that the locking member is moved to its release position or (unlock position) to unlock the buckle, and when the solenoid is deenergized, which would occur upon opening of switch 70, the locking member is moved to its lock position.

Buckle 10 is preferably provided with a manual release means to open the buckle in emergency situations, such as where circuit 66 is opened or becomes shorted out. For this purpose, buckle 10 is provided with a central opening 62 in upper portion 14 of housing 12. Located beneath opening 62 is a push button 64 which has one end pivoted in upper portion 14 adjacent reentrant folded front portion 16. The opposite end of button 64 is adapted to contact a portion of locking member 28 when button 64 is depressed. This in turn would depress locking member 28 against the bias of spring 34 and thereby release tongue 24 in a conventional manner. Obviously, other push button arrangements and other manually actuated release mechanisms, such as a lift lever, may be employed.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

We claim:

1. In a seat belt buckle comprising a housing, an opening in said housing adapted to receive a cooperating tongue having a locking portion, a locking member provided in said housing for locking engagement with said locking portion of said tongue when said tongue is inserted into said opening, and releasing means for releasing said locking member from locking engagement with said locking portion of said tongue, the improvement comprising:
    said releasing means being comprised of
        (a) an electrically energizable actuator; and
        (b) connecting means in contact with said actuator and said locking member, said connecting means being rotatably movable upon energization and deenergization of said actuator;
    said locking member being movable in response to movement of said connecting means between a first position at which said locking member is in locking engagement with said locking portion of said tongue and a second position at which said locking member is out of locking engagement with said locking portion of said tongue, said release means being operable to release said locking member following each energization and deenergization of said actuator.

2. The buckle of claim 1 wherein said actuator comprises a solenoid.

3. The buckle of claim 2 including a plunger on said solenoid and in contact with said connecting means, and wherein when said solenoid is energized, said plunger is extended to move said connecting means to a first position whereby said locking member is moved to its second position and when said solenoid is deenergized, said plunger is retracted to move said connecting means to a second position whereby said locking member is moved to its first position.

4. The buckle of claim 3 wherein said connecting means comprises a pivotable lever, one end of which is connected to said plunger and the opposite end of which is in contact with said locking member.

5. The buckle of claim 4 wherein said connecting means is pivoted on a pin mounted for slidable motion in said housing.

6. The buckle of claim 1 including circuitry means connected to a source of electrical energy for energizing said actuator and a switch means in said circuitry means, said switch means being provided at a location remote from said housing for actuating said energization and deenergization of said actuator.

7. The buckle of claim 1 including means biasing said locking member into locking engagement with said locking portion of said tongue.

8. The buckle of claim 7 wherein said biasing means is a leaf spring.

9. The buckle of claim 1 further comprising manually actuated release means for releasing said locking member from locking engagement with said tongue.

10. The buckle of claim 9 wherein said manually actuated release means is a push button.

* * * * *